United States Patent [19]
Rivera

[11] 3,907,507
[45] Sept. 23, 1975

[54] NOVEL APPARATUS FOR THE OBTENTION OF SUBSTITUTED 1,2-DIHYDROQUINOLINES

[76] Inventor: Heliodoro Monroy Rivera, Insurgentes Sur 591-7th Floor, Mexico 18, D. F., Mexico

[22] Filed: Mar. 6, 1973

[21] Appl. No.: 338,633

Related U.S. Application Data

[63] Continuation-in-part of Ser. No. 137,217, April 26, 1971, abandoned.

[52] U.S. Cl. ................. 23/263; 23/288 R; 23/260; 202/158; 202/161; 202/176; 260/283 R
[51] Int. Cl.² .. B01D 3/02; B01J 8/02; B01D 3/014; C07D 215/00
[58] Field of Search ............. 23/260, 263, 283, 285, 23/288 R, 288 A, 288 K; 202/161, 166, 176, 179, 158; 260/283 R

[56] References Cited
UNITED STATES PATENTS

| | | | |
|---|---|---|---|
| 448,041 | 3/1891 | Hunting | 202/166 |
| 2,027,578 | 1/1936 | De Jahn | 23/283 |
| 2,212,932 | 8/1940 | Fairlie | 23/283 X |
| 2,694,094 | 11/1954 | Lobos | 23/263 X |
| 3,405,039 | 10/1968 | Raley, Jr. | 202/158 X |
| 3,472,630 | 10/1969 | Baldwin et al. | 23/285 |
| 3,600,137 | 8/1971 | Girantet et al. | 23/263 |
| 3,829,292 | 8/1974 | Monroy | 23/263 |

*Primary Examiner*—Morris O. Wolk
*Assistant Examiner*—Roger F. Phillips
*Attorney, Agent, or Firm*—Bacon & Thomas

[57] ABSTRACT

Substituted 1,2-dihydroquinolines are prepared by condensing, in the presence of a catalyst, preferably iodine, a suitably substituted aromatic amine with a carbonyl compound, at a temperature of between 90° and 300°C., said catalyst being preferably present together with an activator selected from alkyl or alkaryl halides. The process is carried out in a novel apparatus essentially comprising mixing and feeding means, a first reactor means being a packed tower of a height sufficient to provide for the necessary residence time of the reaction mixture in continuous ascending flow therethrough, a second reactor means being a packed tower of lesser height, through which the partially reacted mixture descends, an evaporator means to strip the unreacted aromatic amine from the substituted 1,2-dihydroquinoline obtained, and means for stripping the light fractions evolved in the first reactor and in the evaporator and reusing the same as starting materials.

Said evaporator means comprises an externally heated reservoir, a tube-bundle exterior to said reservoir and connected thereto, a packed tower integrally provided on the head of said reservoir, total reflux means in said tower, an annular vessel for condensate within said total reflux means, and partial reflux means connecting said annular vessel to the top of the tower.

2 Claims, 2 Drawing Figures

NOVEL APPARATUS FOR THE OBTENTION OF SUBSTITUTED 1,2-DIHYDROQUINOLINES

This application is a continuation in part of copening U.S. application Ser. No. 137,217 filed on April 26, 1971, and now abandoned.

BACKGROUND OF THE INVENTION

The present invention refers to a novel apparatus for preparing substituted 1,2-dihydroquinolines and, more particularly, it is related to a new apparatus for continuously carrying out the condensation of suitably substituted aromatic amines and a carbonyl compound for producing substituted 1,2-dihydroquinolines having excellent antioxidant, bactericidal, insecticidal and fungicidal properties.

The dihydroquinolines in accordance with the present invention are compounds having high antioxidant and pesticidal properties and generally protect various materials against alterations caused by oxygen and by the influence of insects, fungi, bacteriae and other types of parasites.

The dihydroquinolines in accordance with the preesnt invention are represented by the following general formula

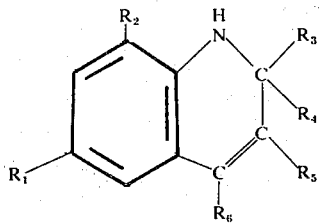

wherein $R_1$ is hydrogen, hydroxy, lower alkoxy, nitro or halogen; $R_2$ is hyrogen, nitro, halogen, alkyl, aryl or carboxyalkyl; $R_3$ is hydrogen or alkyl; $R_4$ is alkyl or aralkyl; $R_5$ is hydrogen or alkyl; and $R_6$ is hydrogen, alkyl or alkaryl.

Dihydroquinolines are highly susceptible to decoloration by the action of the ambient oxygen. For instance, prior publications disclose 1,2-dihydro-2,2,4-trimethylquinoline and 1,2-dihydro-2,2,4-trimethyl-6-ethoxyquinoline as products which are considerably degradated and which suffer intensive decolorations with time. Prior publications particularly described 1,2-dihydro-2,2,4-trimethyl-6-ethoxyquinoline as a brown colored product, but it is quite obvious that such a color is due to the action of the oxygen thereon.

However, it is believed that the intensive decoloration of the prior art dihydroquinolines, is mainly due to impurities present in such products, inasmuch as, upon carefully distilling the above mentioned dihydroquinolines, it is found that they are then much less sensitive to the attack by the oxygen and therefore this proves that, the purer the compound, the less sensitive to the oxygen it is. It is quite probable, therefore, that impurities contained in the commercially available products, are the main cause of decolorations, because said impurities facilitate attack by the oxygen which causes a fast decoloration of said products when the same have not been redistilled.

These compounds can be polymerized through the use of acidic catalysts such as aluminum chloride, boron trifluoride or phosphoric acid in order to produce highly effective antioxidants for rubber and related polymers.

SUMMARY OF THE INVENTION

Having in mind the defects of the prior art dihydroquinolines, it is an object of the present invention to provide new substituted 1,2-dihydroquinolines having highly improved characteristics against decoloration, without the need of having resort to costly purifying procedures.

It is another object of the present invention to provide novel substituted 1,2-dihydroquinolines having high antioxidant, bactericidal, insecticidal and fungicidal properties.

A further object of the present invention is to provided 1,2-dihydroquinolines of the above mentioned character, which will also have an extremely low toxicity to render them useful for their incorporation in food products.

Another object of the present invention is to provide a novel process for the preparation of substituted 1,2-dihydroquinolines, which is of simpler operation as well as of highly economical characteristics.

A further object of this invention is to provide a process of the above mentioned character, which will require a reaction period quite shorter than conventional process, through the use of suitable catalysts.

It is another object of the present invention to provide an apparatus for carrying out a process of the above mentioned character in a continuous manner to produce substituted 1,2-dihydroquinolines.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of certain specific embodiments, when read in connection with the accompanying drawings, in which:

The condensation reaction is preferably effected at high temperatures, such as between 90° and 300°C., and for a period of time of from about 3 to about 12 hours, which conditions are obtained by feeding a cold mixture of the amine, the carbonyl compound and the catalyst into the bottom of a packed tower of sufficient height to provide for a suitable residence time of the reacting mixture, said packed tower being provided with heating means to obtain the desired reaction temperature. A mixture of the carbonyl compound and water is evolved and the carbonyl compound is recovered by fractional distillation to be dried and reused as a starting material in the process.

A mixture of the desired dihydroquinolines product and unreacted aromatic amine is obtained through the bottom of a secondary reactor fed from the first reactor by the top thereof, and said mixture is distilled to recover the aromatic amine and thus purify the 1,2-dihydroquinoline product.

The process for the obtention of the 1,2-dihydroquinolines according to the present invention can be represented by the following equation:

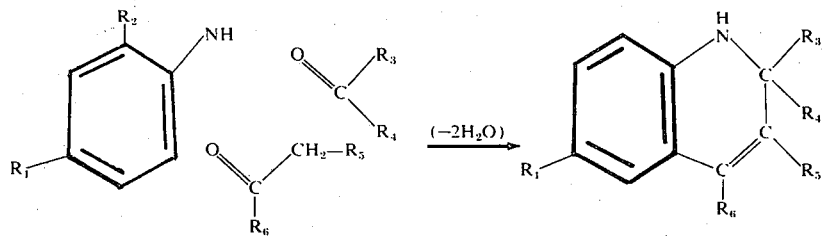

wherein $R_1$ is hydrogen, hydroxy, lower alkoxy, nitro or halogen; $R_2$ is hydrogen, nitro, halogen, alkyl, aryl or carboxyalkyl; $R_3$ is hydrogen or alkyl; $R_4$ is alkyl or aralkyl; $R_5$ is hydrogen or alkyl; and $R_6$ is hydrogen, alkyl or alkaryl.

Any aromatic amine having the above disclosed formula can be used to carry out the process of the present invention, but highly preferable starting compounds are aniline, p-chloroaniline and p-phenetidine for the obtention of substituted 1,2-dihydroquinolines in accordance with the present invention.

Any carbonyl compound represented by the formula disclosed in the above equation can also be used, but the following are preferable: Acetone, methyl ethyl ketone, methyl isobutyl ketone and butyraldehyde.

The catalysts preferred to carry out the condensation reaction which forms the main object of the present invention are iodine, p-toluenesulfonic acid and sulfanilic acid, with iodine being the preferred catalyst in view of the fact that it produces the highest yields and requires the shortest reaction periods. The above catalysts are preferably used in admixture with an activator selected from alkyl or alkenyl halides such as ethylene dichloride, dichloroethylene, trichloroethylene and the like.

The preferred amount of catalyst used in the reaction is of from about 1 to 4%, preferably about 3% by weight on the weight of the aromtic amine.

The activator is desirably added to the catalyst in an amount of from 13 to 80%, preferably about 70% by weight on the weight of catalyst used.

Figure 1:
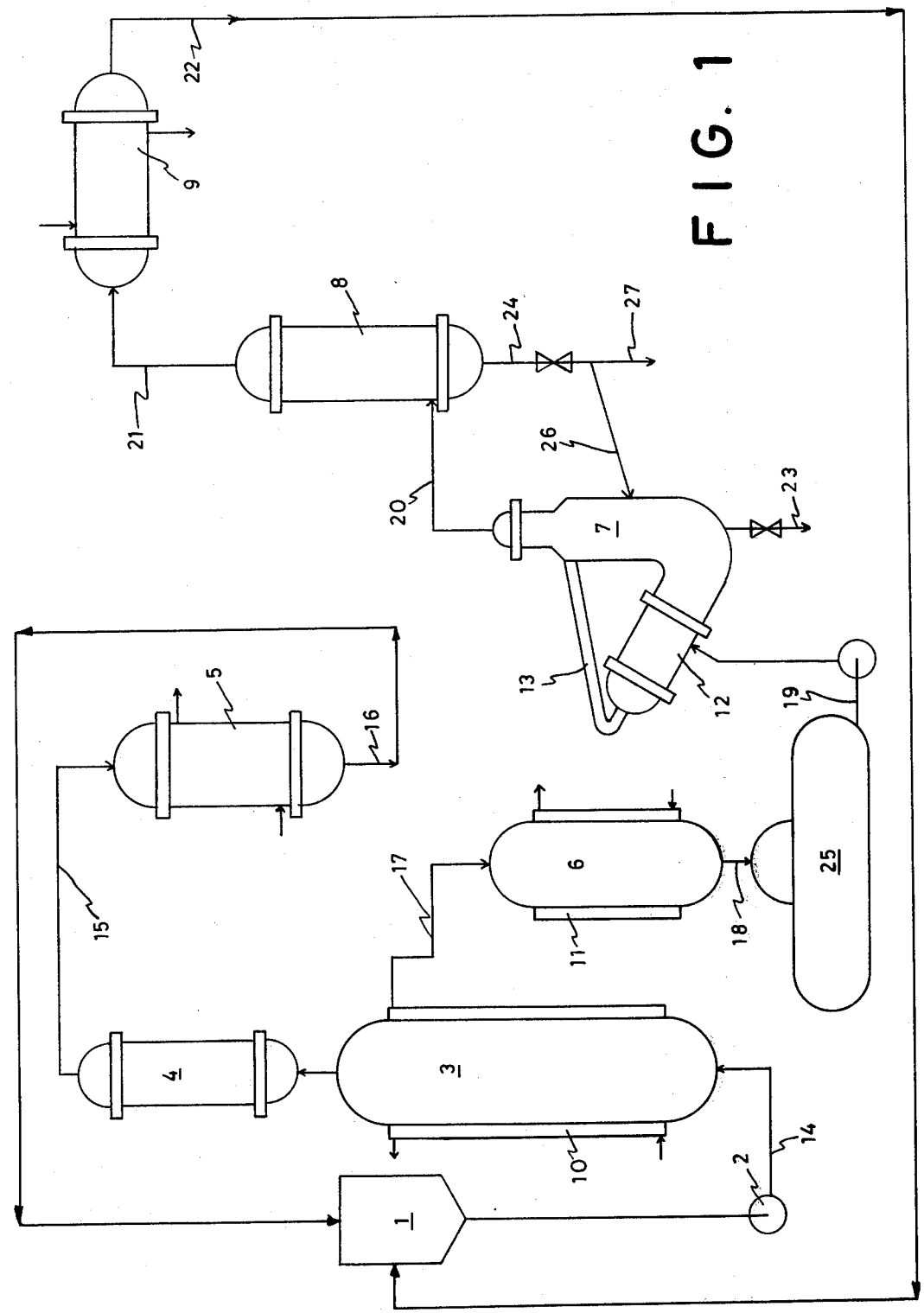
FIG. 1 is a flow sheet diagramatically representing the procedural step and the apparatus used to prepare substituted 1,2-dihydroquinolines in accordance with a first embodiment of the inventionn.

While anyone skilled in the art will clearly understand that the above mentioned process can be effected in any convenient manner such as by letting the starting materials interact in the presence of the catalyst in a batch-type reactor, the present invention contemplates a continuous process which is preferably carried out in an installation of the type diagramatically shown in FIG. 1 of the drawings.

Having now more particular reference to FIG. 1 of the drawing, the apparatus for the continuous manufacture of the 1,2-dihydroquinolines of the present invention comprises a mixing vessel 1, a metering feed pump 2, a first reactor 3, a fractional distillation column 4, a condenser 5, a second reactor 6, a surge tank 25, a circulating evaporator 7, a fractional distillation column 8 and a condenser 9.

Reactor 3 is packed tower provided with external heating means such as an oil jacket 10 or the like, with a suitable packing such as Raschig rings, stainless steel mesh rolls or the like, to provide for a large contacting area, and the height of the column is designed such that a suitable residence time is provided to effect the condensation reaction. Reactor 6 is similar to reactor 3, being a packed tower of a shorter length provided with external heating means such as an oil jacket 11 in order to keep the temperature within the specified desired range.

The process in accordance with the present invention is carried out as follows:

Suitable proportions of the aromatic amine, the carbonyl compound, the catalyst and, if desired, the activator, are continuously fed into the mixing vessel 1 wherein a homogeneous mixture of said ingredients is obtained. The metering feed pump 2 meters a controlled flow of the reaction mixture from vessel 1 into the bottom of reactor 3 through line 14. The mixture is heated to the desired temperature of between about 90° to 300°C., depending on the starting materials used and on the product desired. A mixture of the volatile carbonyl compound and water is vaporized and distilled through the fractionating column 4, in which the higher boiling componds including water are recycled to reactor 3 while the carbonyl compound is carried through line 15 to a suitable condenser 5, from which the liquid carbonyl compound is removed through line 16 to be reused in the process.

The liquid component of the reaction mixture is discharged through the overflow line 17 to the top of the second reactor 6 in which the reaction is completed, with the product mixed with unreacted aromatic amine being discharged through line 18.

The mixture of the dihydroquinoline, water and unreacted aromatic amine is received in a surge tank 25 from which it is discharged through line 19 into a circulating convection evaporator 7 which operates in a batch-like manner.

The evaporator 7 comprises an inclined pipe bundle 12 at which lower end the mixture of 1,2-dihydroquinoline, water and aromatic amine is fed and circulated through the pipe 13 by means of the convection current created by the pipe bundle 12. The aromatic amine, water and other impurities are evaporated and received in fractionating column 8 through line 20 to be furtherly purified. The heavier fraction consisting of the 1,2-dihydroquinoline entrained in the vapors is removed from the bottom of column 8 through line 24, either to be recycled to the evaporator or to be removed as the final product, through line 27, while the lighter fraction comprising aromatic amine, water and other impurities is vaporized through line 21 and furtherly condensed in condenser 9, whence it is discharged in liquid form through line 22 to be rectified or else reused in the process. The desired product can also be discharged through line 23 from evaporator 7 at suitable intervals.

Figure 2:
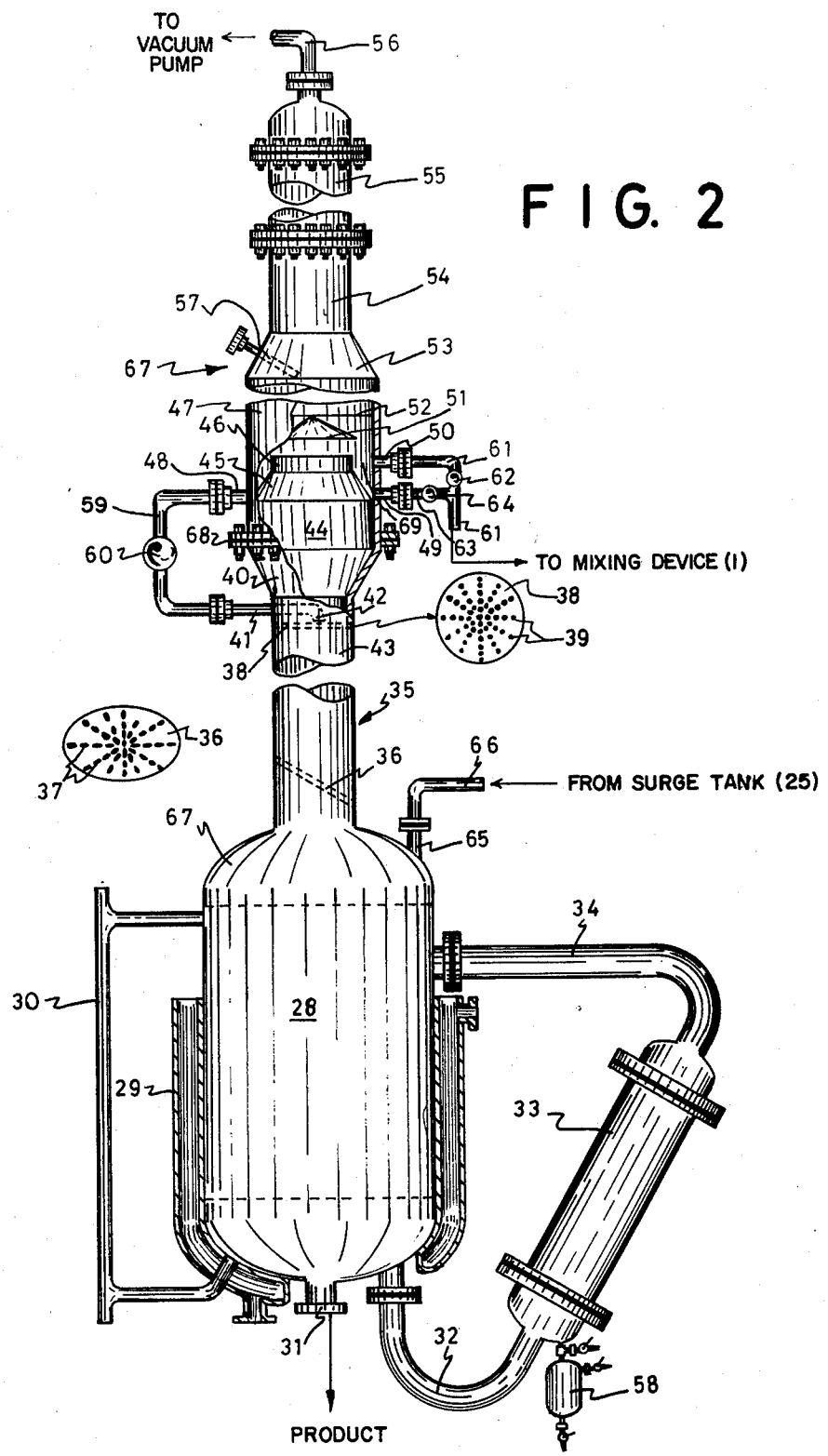
FIG. 2 is an elevational partially cut-away view which shows the inner details of a particularly preferred embodiment of an evaporator to effect the last step of the process.

As a particularly preferred embodiment of the invention, this application contemplates the use of an evaporator system illustrated in FIG. 2 of the drawings, as a substitute of evaporator 7, fractionating column 8 and condenser 9 illustrated in FIG. 1 and as already described in the preceding paragraphs.

The evaporator in accordance with this second embodiment of the present invention comprises a reservoir 28 communicating through a line 32 with the external tube-bundle 33 which opposite end is connected to the upper end of reservoir 28 by means of the line 34. The arrangement of the external tube-bundle 33 is normally at an angle comprised between 50° and 70° with respect to the horizontal and constitutes an external heating and circulating device for the liquid contained in reservoir 28 of the evaporator.

The reservoir 28 has also heating means 29 such as an oil jacket or the like, and a level glass 30 to watch the level of the liquid therewithin.

From the upper head 67 of reservoir 28 an elongated cylindrical column 35 is arranged, said column being provided, near its lower end, with a perforate disk 36 having a plurality of holes 37, being preferably arranged at an angle of about 30° with respect to the horizontal. At the upper end of column 35, a second perforate disk 38 is arranged with a plurality of holes 39 and a suitable packing load generally indicated by means of the reference character 43 is arranged between the disks 37 and 38 in the column.

The column 35 has a top in the shape of an inverted bell at its upper end 40 and on this bell, fastened by means of a joint 68 such as flanges or the like, there is a reflux and discharge section 67 which comprises a lower cylindrical portion 44 which bifurcates to form a second cylindrical portion 47 and an inner portion 45 of a frustoconical shape which comprises at its upper end a cylindrical section 46 of smaller diameter than the cylindrical outer section 47, whereby an annular vessel 69 is formed between portions 45 and 46 on the one hand and the outer portion 47 on the other hand, said vessel serving an object which will be clearly described below when the performance of this device is described. From vessel 69 a plurality of outlets 48 and 49 and an upper outlet 50 extend, the outlet 48 being connected through a line 59 and valve 60 to the reflux pipe 41 which has a discharging nozzle 42 directly arranged on the disk 38 of the packed tower 35.

The outlet 50 is connected to line 61 and the lower outlet 49 is also connected to said line 61 through a pipe 63 and valve 64, with a further valve 62 being provided to control the discharge 50.

Upon the cylindrical upper inner portion 46 of the annular vessel 69, a baffle or deflector 51 is arranged, supported in its place by means of hangers 52 for an object which will be fully described hereinbelow.

The reflux and discharge section 67 of the evaporator in accordance with this embodiment of the invention is provided at its upper end with a frustoconical head 53 through which a control thermocouple 57 is introduced for temperature measurement of the vapors. The head 53 of the reflux section 67 communicates with condenser 55 through a vertical duct 54. Condenser 55 can be of any desired type, but a tube and shell condenser is preferred, and the latter discharges through line 56 which communicates with a vacuum pump suitable for establishing the required vacuum within the apparatus, said vacuum being preferably at most 25 millimeters of mercury absolute.

In order to carry out the process in accordance with the present invention by means of the use of the evaporator of FIG. 2 of the drawings, the mixture of the dihydroquinoline produced, water and unreacted aromatic amine from the surge tank 25 is received through line 66 and charging nipple 65 into the reservoir 28. Once said reservoir is charged to a suitable level, the heating sources 29 and 33 are actuated in order to heat the mixture and to recycle it, thereby generating vapors which are rectified in the packed column 35 and which leave through the inner cylindrical portion 46 of the reflux and discharge section 67, impinging against baffle 51 which avoids any type of surge toward the condenser 55. During the heating operation all valves 60, 62 and 64 remain closed whereby a full reflux of the liquid exists toward the packed column 35, through the filling of the annular vessel 69 by means of the condensation of the vapors and through overflow of the liquid towards the space of the cylindrical inner portion 46 of the reflux section 67. Once the temperature measured by the thermocouple 57 is stabilized, the valve 62 is opened in order to discharge the rectified aromatic amine accompanied by the water through line 61, so as to recycle the same to reactor 3 through the mixing device 1.

The temperature of the vapors is controlled within a close tolerance and, when it again varies, the valve 60 is opened to the desired degree in order to establish a suitable reflux rate toward column 35 through the reflux lines 48, 59, 41, 42. The partial reflux is regulated such that the temperature of the vapors will remain constant and, when said temperature again suddenly raises, the evaporation of the aromatic amine will be considered as completed, whereby the blow down of the annular vessel 69 through line 49, 63 and 61 is then effected by opening the valve 64, at the same time discharging the pure dihydroquinoline from the reservoir 28 through the discharging mouth 31 to obtain the finished purified product.

The embodiment comprising the total reflux evaporator illustrated in FIG. 2 of the drawings is much more efficient than the association of the evaporator 7, the column 8 and the condenser 9, inasmuch as it establishes a suitable control of the parameters of the evaporating process, whereby a purer amine can be obtained, at the same time avoiding losses of the produced dihydroquinoline, because the possibility of a total reflux incorporates control elements which are not extant in the evaporation system in accordance with the embodiment illustrated in FIG. 1 of the drawings.

It will be thus seen that the process for the production of 1,2-dihydroquinolines effected in the apparatus in accordance with the present invention may be considered as a continuous process having a remarkable efficiency and comprising a reaction period of not more than a small fraction of the period of time necessary in a conventional reactor. Also, the design of the continuous reactor of the present invention avoids undue polymerization and resinification of the product formed, in view of the fact that the reaction mixture is subjected to high temperatures only a relatively short time.

The present invention will best be understood by the following illustrative examples, which must be construed as merely illustrative and not restrictive of the true scope of the invitation.

EXAMPLE 1

Preparation of 1,2-dihydro-2,2,4-trimethylquinoline 35 g of metallic iodine, 24 g of trichloroethylene and 2,040 g of aniline are jointly dissolved in 4,020 g of acetone and the mixture is pumped to reactor 3 of the accompanying drawing at a rate of flow suitable to provide a residence time of about 3.5 hours. The jackets of the reactors are fed with heating oil to raise the temperature of the reaction mixture to about 160°C.

A mixture of water, acetone and aniline is fed to column 4 and practically pure acetone is removed in the form of vapors to be condensed in condenser 5 whence the acetone is recirculated to the process.

The mixture of unreacted aniline and the product obtained is received in the surge tank 25 and then evaporated and rectified in order to purify the product and remove water and the aniline, to be reused in the process.

The reaction effected in accordance with this example can be represented by the following equation:

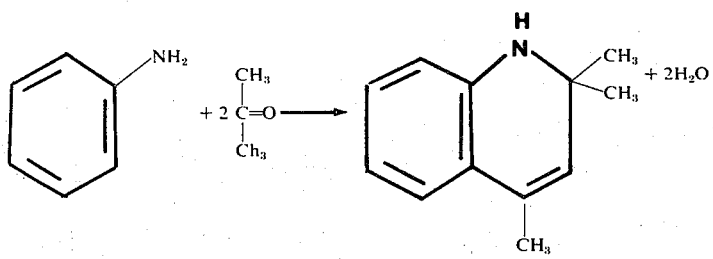

The 1,2-dihydro-2,2,4-trimethylquinoline obtained is a brown colored product having a refractive index at 23°C. of 1.528, a boiling point 0.1 mm of mercury of 94° to 96°C. and a specific gravity at 22°C. of 0.9430. The conversion rate per pass calculated on the aniline feed was approximately 45%.

The product obtained is an antioxidant having parasiticide properties, which can be polymerized to enhance its stability and activity.

EXAMPLE 2

Preparation of 1,2-dihydro-2,3,4-trimethyl-2-ethylquinoline

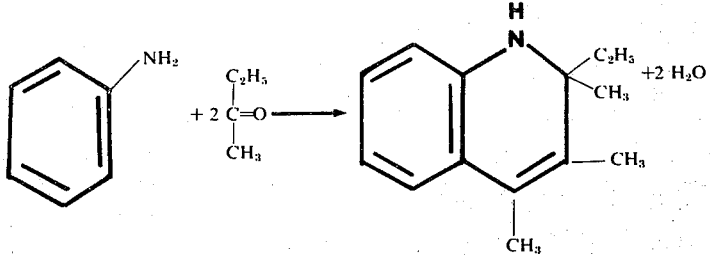

In the same manner described in example 1, 40 g of iodine, 28 g of ethylene dichloride, 2,040 g of aniline and 5,000 g of methyl ethyl ketone are reacted at a temperature of 185°C. for a period of about 5 hours and 40 minutes.

The 1,2-dihydro-2,3,4-trimethyl-2-ethylquinoline thus obtained is a yellow liquid having a refractive index at 24°C of 1.571, a boiling point at 0.1 mm of mercury of 110° to 112°C. and a specific gravity at 23.5°C. of 0.9712. The conversion rate per pass calculated on the aniline feed is of about 37%.

The product obtained is an excellent antioxidant having remarkable parasiticide properties.

EXAMPLE 3

Preparation of 1,2-dihydro-2,2,4-trimethyl-6-ethoxyquinoline

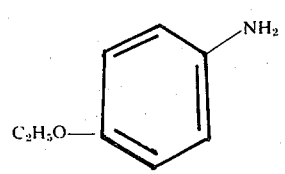 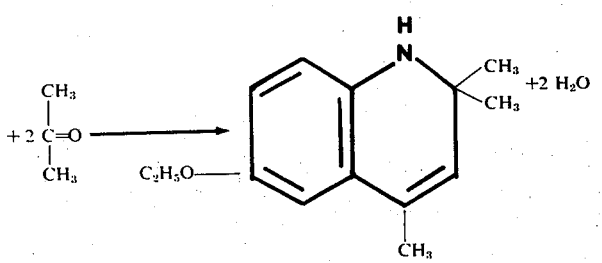

45 g of metallic iodine, 9 g of trichloroethylene, 3,000 g of p-phenetidine and 4,020 g of acetone are reacted in the same manner described in Example 1 at a temperature of about 205°C. and at a rate of flow suitable to provide for a residence time of about 4 hours and 40 minutes.

The 1,2-dihydro-2,2,4-trimethyl-6-ethoxyquinoline obtained was a light yellow to amber colored liquid having a refractive index at 20°C. of 1.568, a boiling point at 0.1 mm of mercury of 134° to 136°C. and a specific gravity at 21°C. of 1.031. The conversion rate per pass calculated on the p-phenitidine was about 40%.

The product obtained proved to be an excellent antioxidant having remarkable insecticide, fungicide and bactericide properties, which can be polymerized to enhance its stability and activity.

EXAMPLE 4

Preparation of 1,2-dihydro-2,3,4-trimethyl-2-ethyl-6-ethoxyquinoline

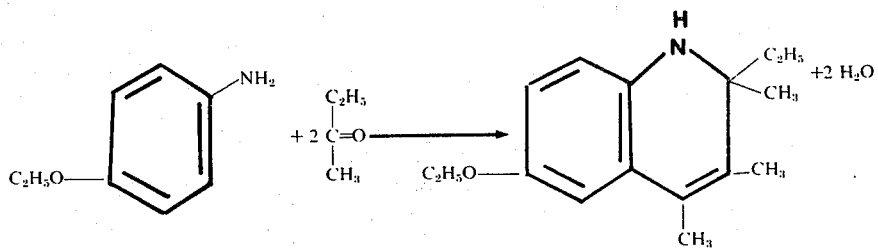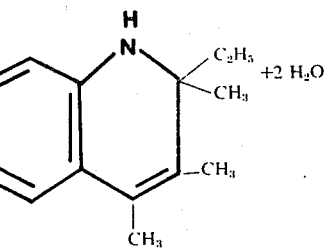

In the same manner described in Example 1, 30 g of iodine, 21 g of dichloroethylene, 200 g of p-phenetidine and 3,500 g of methyl ethyl ketone are reacted at a temperature of about 220°C. and for a period of about 5 hours and 20 minutes.

The 1,2-dihydro-2,3,4-trimethyl-2-ethyl-6-ethoxyquinoline obtained was a yellow to light amber colored liquid having a refractive index at 23°C. of 1.560, a boiling point at 0.1 mm of mercury of 139° to 141°C. and a specific gravity at 23.2°C. of 0.9858. The conversion rate per pass calculated on the p-phenetidine was of about 38.5%.

The product obtained produced excellent results as an antioxidant and possessed good parasiticide properties.

EXAMPLE 5

Preparation of 1,2-dihydro-2n-propyl-3-ethylquinoline

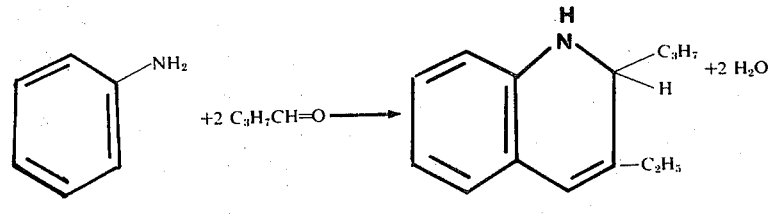

40 g of sulphanilic acid, 2,040 g of aniline and 5,000 g of n-butyraldehyde are reacted in the same manner described in example 1, at a temperature of about 180°C. for a period of about 10 hours.

In this particular case iodine and unreacted n-butyraldehyde and aniline are not separately obtained but, on the contrary, the aniline completely reacts forming three different products. The first product is the Schiff base formed between the aniline and the butyraldehyde, represented by the formula $$C_6H_5—N = CH—(CH_2)_2—CH_3$$

having a boiling point at 0.1 mm of mercury of 98° to 105°C. The second product is the desired 1,2-dihydro-2-n-propyl-3-ethylquinoline and the third product is a resinuous soft residue probably comprising a polymerization product of the substituted dihydroquinoline due to the rather long reaction period necessary in this particular case.

The desired product is purified by decantation of the solid residue in the surge tank 25 and is then evaporated and fractionally distilled in order to separate it from the Schiff base, with the latter being reused to continue the reaction of additionally forming the substituted dihydroquinoline.

The 1,2-dihydro-2-n-propyl-3-ethylquinoline obtained was a light lemon green colored liquid having a refractive index at 23°C of 1.570, a boiling point at 0.1 mm of mercury of 120° to 122°C. and a specific gravity at 22.5°C. of 0.9776. The conversion rate per pass calculated on the aniline feed was about 35%.

The product obtained was an excellent antioxidant having very good parasiticide properties.

EXAMPLE 6

Preparation of 1,2-dihydro-2-n-propyl-3-ethyl-6-ethoxyquinoline

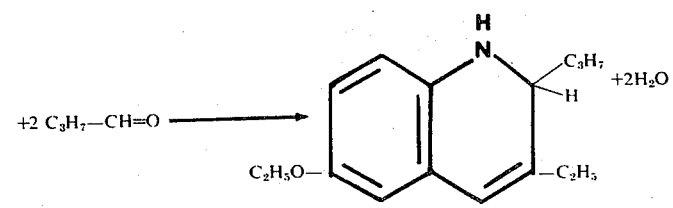

In the same manner described in example 5, a mixture of 30 g of p-toluene sulfonic acid, 2,000 g of p-phenetidine and 4,400 g of n-butyraldehyde is reacted at a temperature of about 220°C. and for a period of 4 hours and 15 minutes.

In this particular case the Schiff base of the p-phenetidine and butyraldehyde is also obtained having the formula $$C_2H_5O—C_6H_4—N = CH—CH_2—CH_2—CH_3$$

with a boiling point at 0.1 mm of mercury of 140° to 145°C. Also, of course, the desired 1,2-dihydro-2-n-propyl-3-ethyl-6-ethoxyquinoline is formed.

The desired product is fractionally distilled under vacuum in order to purify it and remove the Schiff base, the latter being recirculated to the reaction to additionally form the desired dihydroquinoline.

The 1,2-dihydro-2-n-propyl-3-ethyl-6-ethoxyquinoline obtained was a light lemon green colored liquid with a refractive index at 20°C. of 1.559, a boiling point at 0.1 mm of mercury of 154° to 158°C. and a specific gravity at 22.7°C of 1.0006. The yield on the p-phenetidine feed was about 33%.

The product obtained was an excellent antioxidant with very good parasiticide properties.

EXAMPLE 7

Preparation of 1,2-dihydro-2,2,4-trimethyl-6-chloroquinoline

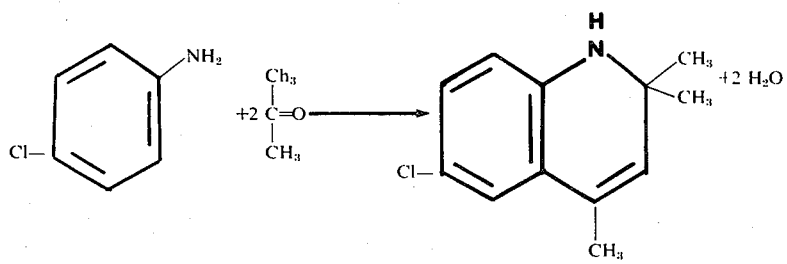

In the same manner described in example 1 a mixture of 22 moles of p-chloroaniline, 70 moles of acetone with 2% of p-toluene sulfonic acid and 1.4% of ethylene dichloride were reacted at a temperature of about 180°C. for a period of about 5 hours.

The 1,2-dihydro-2,2,4-trimethyl-6-chloroquinoline obtained was an amber colored solid with a melting point of 48° to 49°C. and a boiling point at 0.1 mm of mercury of 134° to 137°C.

The product obtained was a good antioxidant having parasiticide properties.

EXAMPLE 8

Preparation of 1,2-dihydro-2,3,4-trimethyl-2-ethyl-6-chloroquinoline

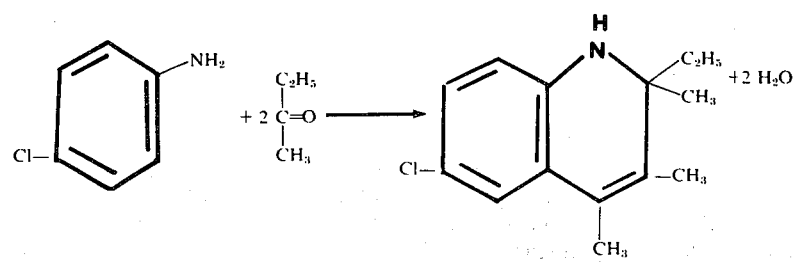

In the same manner described in example 1, a mixture of 22 moles of p-chloroaniline, 70 moles of methyl ethyl ketone, 2% of iodine and 1.4% of trichloroethylene were reacted at a temperature of about 180°C for a period of about 5.5 hours.

The 1,2-dihydro-2,3,4-trimethyl-2-ethyl-6-chloroquinoline obtained was an amber colored solid with a melting point of 48° to 49°C. and a boiling point at 0.1 mm of mercury of 155°C.

The product obtained was a good antioxidant having parasiticide properties.

EXAMPLE 9

Preparation of 1,2-dihydro-2,2,4-trimethyl-8-nitroquinoline

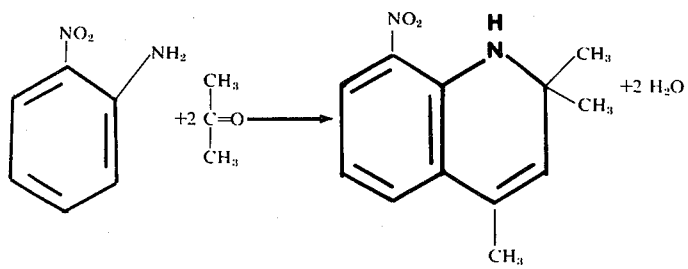

In the same manner described in example 1 a mixture of 22 moles of o-nitroaniline, 70 moles of acetone with 2% of p-toluene sulfonic acid and 1.4% of ethylene dichloride was reacted at a temperature of about 180°C. for a period of about 4.5 hours.

The 1,2-dihydro-2,2,4-trimethyl-8-nitroquinoline obtained was an amber colored solid with a melting point of about 60°C. and a boiling point at 0.1 mm of mercury of about 150°C.

The product obtained was a good antioxidant having parasiticide properties.

EXAMPLE 10

Preparation of 1,2-dihydro-2,4-dimethyl-2-isobutyl-3-isopropylquinoline

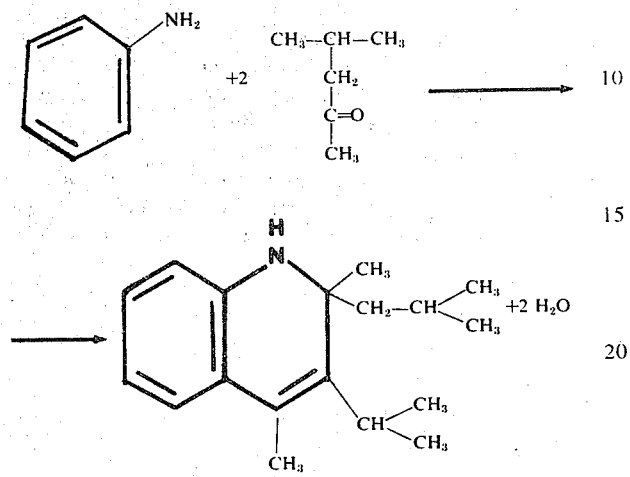

In the same manner described in example 1, a mixture of 22 moles of aniline, 70 moles of methyl isobutyl ketone, 2% of metallic iodine and 1.4% of ethylene dichloride was reacted at a temperature of 180°C. for a period of about 6 hours.

The 1,2-dihydro-2,4-dimethyl-2-isobutyl-3-isopropylquinoline obtained was an orange yellowish colored liquid having a refractive index at 23°C of 1.550, a boiling point at 0.1 mm of mercury of 140° to 145°C. and a specific gravity at 19°C. of 0.9063.

The product obtained was an excellent antioxidant with very good parasiticide properties.

From the above it will be clearly seen that a highly improved and efficient process has been provided for the obtention of substituted 1,2-dihydroquinolines having excellent antioxidant properties and also being very good fungicides, insecticides and bactericides. Also, a novel apparatus to carry out the above described process has been provided, in which the continuous efficient production of the substituted 1,2-dihydroquinolines of the present invention can be effected with increased efficiency and reduced reaction times, thus producing very high quality compounds.

I claim:

1. An apparatus for the continuous production of substituted 1,2-dihydroquinolines by the reaction of an aromatic amine with the corresponding substituted carbonyl compound in the presence of a catalyst, said apparatus comprising:
   1. first reactor means consisting of a tower having a packed extended surface therein and means associated therein to heat said tower and having a height sufficient to provide the necessary residence time for the reaction mixture ascending therethrough;
   2. means for mixing and feeding the reactants and catalyst to the bottom portion of said first reactor means whereby said reactants flow upwardly therethrough producing a reaction mixture comprised of a liquid and a vapor portion;
   3. second reactor means consisting of a tower having a packed extended surface therein and means associated therein to heat said tower and having a height less than the height of said first reactor means;
   4. means to remove the liquid portion of said reaction mixture from the top portion of said first reactor means and feed said liquid portion to the top of said second reactor means whereby said liquid portion descends therethrough and said reaction is completed thereby producing a first liquid mixture containing the substituted product and unreacted aromatic amine;
   5. first distillation means for distilling the vapor portion of said reaction mixture;
   6. means to feed said vapor portion of said reaction mixture from said first reactor means to said first distillation means whereby a first distillation is conducted producing a first heavy liquid fraction which is recycled to the top portion of said first reactor means as reflux and a first light vapor fraction comprising unreacted carbonyl compound;
   7. a first condenser means for condensing said first light vapor fraction and means to feed said first light vapor fraction from said first distillation means to said first condenser means, said first condenser means being provided with a first recycle means to recycle the condensed first light vapor fraction to said mixing and feeding means;
   8. a surge tank means and means to feed said first liquid mixture from the bottom portion of said second reactor means to said surge tank means;
   9. evaporator means for separating the substituted product from the unreacted aromatic amine in said first liquid mixture and pumping means for pumping said first liquid mixture from said surge tank means to said evaporator means, said evaporator means consisting of a circulating convection evaporator comprising a reservoir, heating means in said reservoir, inclined tube bundle means externally arranged of said reservoir, first conduit means communicating the lower end of said tube bundle means with the bottom of said reservoir and second conduit means communicating the upper end of said tube bundle means with the upper portion of said reservoir, said evaporator means also being provided with means for discharging liquid substituted product therefrom, the evaporation occurring therein producing a second vapor stream containing unreacted aromatic amine and substituted product;
   10. second distillation means for distilling said second vapor stream and integrally arranged on the top of said reservoir and in direct communication therewith to feed said second vapor stream from said evaporator means to said second distillation means, whereby a second distillation is conducted producing a second heavy liquid fraction comprising substituted product and a second light vapor fraction comprising unreacted aromatic amine; said second heavy liquid fraction being thereby recycled to said reservoir of said evaporator means and said second light vapor fraction being discharged through the top of said second distillation means;
   11. reflux means for recycling the condensed second light vapor fraction down to the top of said second distillation means, said reflux means being integrally arranged and in direct communication with the top of said second distillation means and having total reflux means comprising an annular vessel within said reflux means to collect all the condensed second light vapor fraction, the top of said annular vessel being open to permit the overflow of said condensed second light vapor fraction into the top of said second distillation means and the central cross section of said annular vessel being such that the said second light vapor fraction is permitted to upwardly pass therethrough, and partial reflux means connecting the bottom of said annular vessel to the top of said second distillation means, said annular vessel being provided with a liquid unreacted aromatic amine discharge means and second recycle means to recycle said liquid unreacted aromatic amine to said mixing and feeding means; and 12. vertical condenser means for condensing said second light vapor fraction, said vertical condenser means being integrally arranged and in direct communication with the top of said reflux means for receiving said second light vapor fraction and to discharge therethrough and recycle the condensed second light vapor fraction into said annular vessel of said total reflux means.

2. An apparatus according to claim 1 wherein said total reflux means comprises a cylindrical receptacle, an inner frustoconical member extending upwardly from the lower third of said cylindrical receptacle, a cylindrical member engaged to the top of said frustoconical member concentrically to said cylindrical receptacle and within the same, and a shallow conical baffle of a diameter slightly larger than the diameter of said cylindrical member and arranged directly above and spaced from said cylindrical member, whereby all said condensed second light fraction will be directed from said vertical condenser means over said shallow conical baffle, into said annular receptacle to overflow over said cylindrical member and into the top of said second distillation means.

* * * * *

UNITED STATES PATENT OFFICE
CERTIFICATE OF CORRECTION

Patent No. 3,907,507          Dated September 23, 1975

Inventor(s) HELIODORO M. RIVERA

It is certified that error appears in the above-identified patent and that said Letters Patent are hereby corrected as shown below:

Following Item [63], Column 1, first page, the foreign priority data should be inserted as Item [30] as follows:

Foreign Application Priority Data
May 4, 1974   Mexico ............. 135,186

Signed and Sealed this sixteenth Day of March 1976

[SEAL]

Attest:

RUTH C. MASON
*Attesting Officer*

C. MARSHALL DANN
*Commissioner of Patents and Trademarks*